(12) United States Patent  
Moyne (10) Patent No.: US 9,886,009 B2  
(45) Date of Patent: Feb. 6, 2018

(54) METHODS AND APPARATUSES FOR UTILIZING ADAPTIVE PREDICTIVE ALGORITHMS AND DETERMINING WHEN TO USE THE ADAPTIVE PREDICTIVE ALGORITHMS FOR VIRTUAL METROLOGY

(71) Applicant: James Moyne, Canton, MI (US)

(72) Inventor: James Moyne, Canton, MI (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 341 days.

(21) Appl. No.: 14/673,228

(22) Filed: Mar. 30, 2015

(65) Prior Publication Data

US 2015/0205270 A1 Jul. 23, 2015

Related U.S. Application Data

(63) Continuation of application No. 13/027,072, filed on Feb. 14, 2011, now Pat. No. 9,002,492.

(60) Provisional application No. 61/305,089, filed on Feb. 16, 2010.

(51) Int. Cl.
```
G06F 19/00    (2011.01)
G05B 13/02    (2006.01)
G05B 23/02    (2006.01)
G06N 5/04     (2006.01)
```

(52) U.S. Cl.
CPC ....... *G05B 13/026* (2013.01); *G05B 23/0297* (2013.01); *G06N 5/04* (2013.01); *G05B 2219/31459* (2013.01); *G05B 2219/31465* (2013.01); *G05B 2219/31483* (2013.01)

(58) Field of Classification Search
CPC ............. G05B 13/026; G05B 23/0297; G05B 2219/31459; G05B 2219/31483; G05B 2219/31465; G06N 5/04
USPC ................................... 700/104, 119
See application file for complete search history.

(56) References Cited

U.S. PATENT DOCUMENTS

| 7,493,185 | B2 | 2/2009 | Cheng et al. |
| 7,558,771 | B2 | 7/2009 | Barajas et al. |
| 8,095,484 | B2 | 1/2012 | Cheng et al. |
| 8,145,337 | B2 | 3/2012 | Lin et al. |
| 8,433,434 | B2 | 4/2013 | Wang et al. |
| 2003/0061212 | A1* | 3/2003 | Smith ............... G06Q 10/06 |

(Continued)

FOREIGN PATENT DOCUMENTS

| KR | 1020090001148 | 1/2009 |
| TW | 200742951 | 11/2007 |
| TW | 200745974 A | 12/2007 |

OTHER PUBLICATIONS

"International Preliminary Report on Patentability", dated Aug. 21, 2012, for PCT/US2011/024872, 4 pages.

(Continued)

*Primary Examiner* — Ziaul Karim  
(74) *Attorney, Agent, or Firm* — Patterson + Sheridan, LLP (57) ABSTRACT

Described herein are methods, apparatuses, and systems for determining adaptive predictive algorithms for virtual metrology. In some embodiments, a computer implemented method identifies a plurality of predictive algorithms. The method determines when to use one or more of the plurality of predictive algorithms to predict one or more virtual metrology variables in a manufacturing facility.

20 Claims, 8 Drawing Sheets

(56) References Cited

U.S. PATENT DOCUMENTS

| | | | |
|---|---|---|---|
| 2006/0129257 | A1 | 6/2006 | Chen et al. |
| 2006/0184264 | A1 | 8/2006 | Willis et al. |
| 2006/0184460 | A1* | 8/2006 | Cleary ................. G06N 99/005 706/12 |
| 2007/0100487 | A1* | 5/2007 | Cheng .............. G05B 19/41875 700/108 |
| 2007/0282767 | A1 | 12/2007 | Cheng et al. |
| 2008/0064127 | A1 | 3/2008 | Yu et al. |
| 2008/0275586 | A1* | 11/2008 | Ko ..................... G05B 23/0221 700/110 |
| 2008/0275676 | A1 | 11/2008 | Lin et al. |
| 2008/0306625 | A1 | 12/2008 | Cheng et al. |
| 2009/0292386 | A1* | 11/2009 | Cheng .............. G05B 19/41875 700/109 |
| 2010/0332013 | A1 | 12/2010 | Choi et al. |
| 2011/0009998 | A1 | 1/2011 | Wang et al. |
| 2011/0054819 | A1 | 3/2011 | Lin |
| 2011/0060441 | A1 | 3/2011 | Ko et al. |
| 2011/0251707 | A1* | 10/2011 | Cheng .............. G05B 19/41875 700/100 |

OTHER PUBLICATIONS

"International Search Report", dated Sep. 28, 2011, for PCT/US2011/024872, 3 pages.

"Written Opinion of the International Searching Authority", dated Sep. 28, 2011, for PCT/US2011/024872, 3 pages.

Bunkfske, R. , "The Use of Hierarchical Data Analysis to Predict End of Line Electrical Test parameters From In-line FDC Data", *In Proceedings of the AEC/APC Symposium*, Sep. 2004, 17 pages.

Chen, Yeh-Tung , et al., "Multivariate Simulation Assessment for Virtual Metrology", *Proceedings of the 2006 IEEE International Conference ofn Robotics and Automation*, Orlando, Florida, USA, May 2006, 6 pages.

Chen, Pinghsu , et al., "Virtual Metrology: A Solution for Wafer to Wafer Advanced Process Control", *IEEE 2009*, 3 pages.

Cheng, Fan-Tien , et al., "Evaluating Reliance Level of a Virtual Metrology System", *IEEE Transactions on Semiconductor Manufacturing*, vol. 21, No. 1, Feb. 2008, 12 pages.

Han, K. P., et al., "Implementation of Virtual Metrology by Selection of Optimal Adaptation Method", *AEC/APC Symposium XXI*, Sep. 27-30, 2009, 34 pages.

Khan, A. , et al., "An Approach for Factory-Wide Control Utilizing Virtual Metrology", *IEEE Transactions on Semiconductor Manufacturing*, vol. 20, No. 4, Nov. 2007, pp. 364-375.

Khan, Aftab , et al., "On the Quality of Virtual Metrology Data for Use in the Feedback Process Control", *AEC/APC Symposium XIX*, Indian Wells, CA, Sep. 2007, 25 pages.

Khan, Aftab A., et al., "Virtual metrology and feedback control for semiconductor manufacturing processes using recursive partial least squares", *Journal of Process Control 18* (2008), pp. 961-974.

Lin, Tung-Ho , et al., "A Novel Key-variable Sifting Algorithm for Virtual Metrology", *2008 IEEE International Conference on Robotics and Automation*, Pasadena, CA, USA, May 19-23, 2008, 6 pages.

Lin, Tung-Ho , et al., "A Virtual Metrology Scheme for Predicting CVD Thickness in Semiconductor Manufacturing", *Proceedings of the 2006 IEEE International Conference on Robotics and Automation*, Orlando, Florida, USA, May 2006, 6 pages.

Lin, June-Shien , et al., "Model Based Wafer-to-Wafer Control for CU CMP", *VLSI Multilevel Interconnect Conference 2003*, Marina del Ray, CA Sep. 2003, 9 pages.

Moyne, James , "A Blueprint for Enterprise-wide deployment of advanced process control", *Solid State Technology*, vol. 52, No. 7, (Jul. 1, 2009), 5 pages., http://www.electroiq.com/articles/sst/print/volume-52/issue-7/features/a-blueprint-for-enterprise-wide-deployment-of-advanced-process-control.html.

Su, Yu-Chuan , et al., "A Processing Quality Prognostics Scheme for Plasma Sputtering in TFT-LCD Manufacturing", *IEEE Transactions on Semiconductor Manufacturing*, vol. 19, No. 2, May 2006, 12 pages.

First Office Action of the State Intellectual Property Office of the People's Republic of China for Application No. 2011800009965.1, dated May 5, 2014, 5 pages.

\* cited by examiner

METHODS AND APPARATUSES FOR UTILIZING ADAPTIVE PREDICTIVE ALGORITHMS AND DETERMINING WHEN TO USE THE ADAPTIVE PREDICTIVE ALGORITHMS FOR VIRTUAL METROLOGY

CLAIM OF PRIORITY

This patent application is a Continuation of, and claims priority to, and incorporates by reference in its entirety the corresponding U.S. application Ser. No. 13/027,072 filed on Feb. 14, 2011, which claims priority to U.S. Provisional Application No. 61/305,089, filed Feb. 16, 2010, which is incorporated by reference in its entirety.

TECHNICAL FIELD

Embodiments of the present invention relate to prediction algorithms for virtual metrology, and more specifically to utilizing and determining prediction algorithms.

BACKGROUND

Equipment Engineering Systems (EES) manage the processing of product by manufacturing machines. Yield Management Systems (YMS) utilize parametric and e-test data to analyze yield excursions. Some conventional yield management systems leverage data from a fault detection and classification (FDC) system of conventional equipment engineering systems to provide yield engineers additional data when analyzing yield. In a limited number of conventional yield management systems, the data from the FDC system is used to predict yield. This yield prediction may enable yield engineers to detect potential yield problems before a product has been completed.

One of the biggest problems with technologies that utilize prediction as a cornerstone capability, such as virtual metrology (VM) and yield management enhanced advanced process control (YMeAPC), is the quality of the prediction, especially in the presence of a dynamic prediction environment. There are a number of prediction techniques and prediction adaptation techniques available. Oftentimes, different prediction adaptation techniques work better in different environments. Currently there is no defined way to take advantage of multiple prediction adaptation capabilities in a collaborative fashion to improve prediction quality.

Manufacturing processes are subjected to disturbances and drifts. Wafer-to-wafer (W2W) control of drifting processes requires inline metrology, which adds cost for the metrology station, increases cycle time, and reduces throughput. A trade-off exists between speed of measurements and accuracy. Virtual metrology includes the prediction of metrology variables using information about the state of the process for every wafer. Virtual metrology utilizes FDC data and upstream metrology information for prediction algorithms. Virtual metrology predicts metrology variables (either measurable or non-measurable) based on a state of the process and/or product.

An approach for factory-wide control utilizing virtual metrology is described in the article "Fab-wide Control Utilizing Virtual Metrology," IEEE Transactions on Semiconductor Manufacturing, Vol. 20, No. 4, November 2007 by Aftab A. Khan, James R. Moyne, and Dawn M. Tilbury. This article "Fab-wide Control Utilizing Virtual Metrology," which is herein incorporated by reference, discloses a partial least squares (PLS) technique and also double exponentially weighted moving average (dEWMA) controllers that are commonly applied in semiconductor manufacturing processes.

However, prior virtual metrology approaches fail to provide a robust and reusable virtual metrology solution. The current state-of-the-art of virtual metrology includes a number of "one-off" highly customized, non-reusable solutions. These approaches are not very robust over time. Uses are limited due to a lack of understanding of data quality. Prior approaches fail to provide high quality adaptive virtual metrology modeling.

BRIEF DESCRIPTION OF THE DRAWINGS

The present invention is illustrated by way of example, and not by way of limitation, in the figures of the accompanying drawings and in which.

DETAILED DESCRIPTION

Described herein are methods, apparatuses, and systems for determining adaptive predictive algorithms for virtual metrology. In some embodiments, a system collects data and utilizes multiple predictive algorithms. The system may then determine when to use the multiple predictive algorithms to predict virtual metrology variables (either measurable or non-measurable) in a manufacturing facility. The virtual metrology variables may include, for example, predicted values for outputs at the end of a process run, related preprocess metrology data from upstream processes, etc. Specific examples include film thickness and uniformity after a Chemical Vapor Deposition (CVD) processes, and critical dimension (CD) average and variation after an etch process. In other embodiments, the system switches between multiple predictive algorithms based on an error switching threshold. The threshold may be based on actual metrology data. The system may switch between predictive algorithms using the error switching threshold if actual metrology data is available. Otherwise, the system may use a quality threshold to determine when to switch between predictive algorithms. In yet some other embodiments, the system simultaneously utilizes multiple predictive algorithms. A predictive algorithm may be invoked based on a weighted average of other predictive algorithms.

As discussed above, prior approaches fail to provide high quality adaptive VM. The VM of the present disclosure can provide a multi-algorithm Adaptive Partial Least Squares (PLS) that accounts for over time changes of the relationship between fault detection (FD) outputs and metrology predictions. In addition or alternatively, the VM of the present disclosure can provide a data quality prediction that avoids false positives and allows for quantitative use of VM data for applications such as W2W control. The VM of the present disclosure may also determine the FD factors that are the best VM predictors as well as develop VM capability to be re-usable.

VM data quality prediction is a capability that is critical for many applications of VM. For Wafer to Wafer control, this capability allows appropriate setting of controller gain based on feedback data quality. For metrology FD utilized for tool shut-down, this capability reduces incidence of false positives. For predictive and preventative maintenance, this capability reduces incidence of false positives. Generally, this capability allows VM to be more effective because results can be "trusted."

The VM of the present disclosure provides benefits such as improved Wafer-to-Wafer control, yield prediction, enhanced predictive and preventative maintenance (PPM), and more effective use of existing metrology.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. Unless specifically stated otherwise, as apparent from the following discussion, it is appreciated that throughout the description, discussions utilizing terms such as "collecting", "predicting", "performing", "adjusting", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine (e.g., a computer) readable storage medium includes read only memory ("ROM"), random access memory ("RAM"), magnetic disk storage media, optical storage media, flash memory devices, etc.

Figure 1:
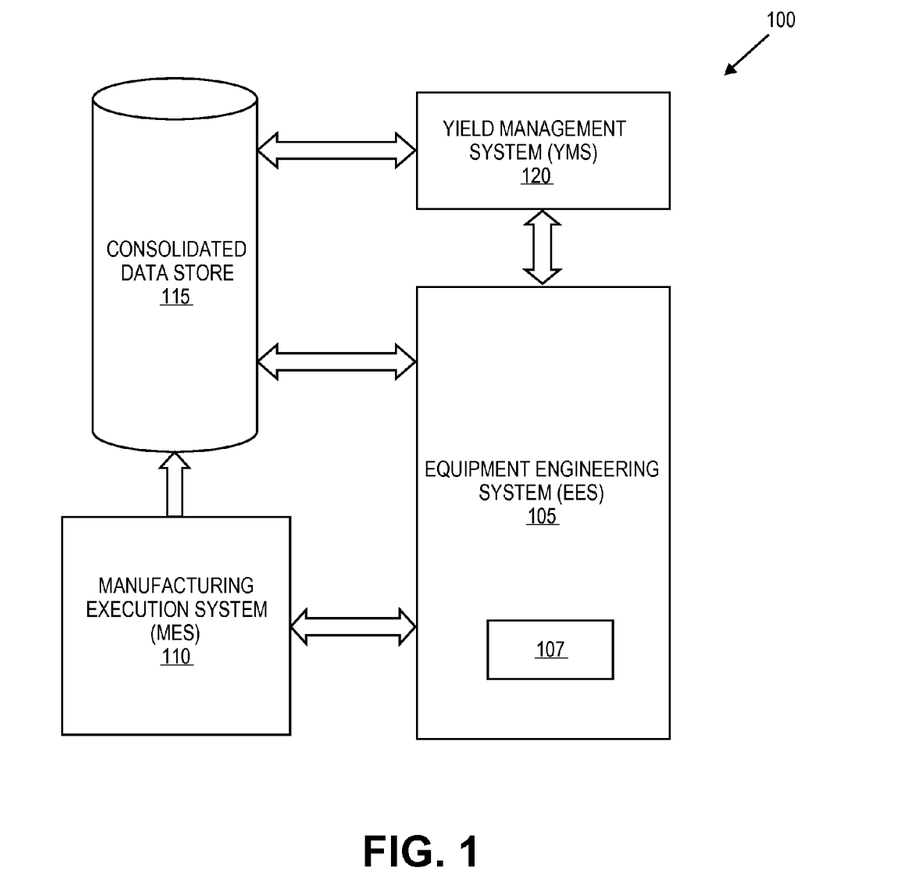
FIG. 1 illustrates an exemplary architecture of a manufacturing environment, in which embodiments of the present invention may operate.

FIG. 1 illustrates an exemplary architecture of a manufacturing environment 100, in which embodiments of the present invention may operate. The manufacturing environment 100 may be a semiconductor manufacturing environment, an automotive manufacturing environment, aerospace equipment manufacturing environment, medical equipment manufacturing environment, display and solar manufacturing environment, etc. In one embodiment, the manufacturing environment 100 includes an equipment engineering system (EES) 105, a VM multi-algorithm predictive subsystem 107 within the EES system 105 or some other system coupled to the EES via a network, a manufacturing execution system (MES) 110, a yield management system (YMS) 120 and a consolidated data store 115. The EES 105, MES 110, YMS 120 and consolidated data store 115 may be connected via a network (not shown), such as a public network (e.g., Internet), a private network (e.g., Ethernet or a local area Network (LAN)), or a combination thereof.

The manufacturing execution system (MES) 110 is a system that can be used to measure and control production activities in a manufacturing environment. The MES 110 may control some production activities (e.g., critical production activities) or all production activities of a set of manufacturing equipment (e.g., all photolithography equipment in a semiconductor fabrication facility), of a manufacturing facility (e.g., an automobile production plant), of an entire company, etc. The MES 110 may include manual and computerized off-line and/or on-line transaction processing systems. Such systems may include manufacturing machines, metrology devices, client computing devices, server computing devices, databases, etc. that may perform functions related to processing.

In one embodiment, the MES 110 is connected with a consolidated data store 115. The consolidated data store 115 may include databases, file systems, or other arrangements of data on nonvolatile memory (e.g., hard disk drives, tape drives, optical drives, etc.), volatile memory (e.g., random access memory (RAM)), or combination thereof. In one embodiment, the consolidated data store 115 includes data from multiple data stores (e.g., a YMS data store, a maintenance data store, a metrology data store, process data stores, etc.) that are interconnected. The consolidated data store 115 may store, for example, historical process information of manufacturing recipes (e.g., temperatures, pressures, chemicals used, process times, etc.), equipment maintenance histories, inventories, etc. The consolidated data store 115 may also store data generated by the MES 110, YMS 120 and/or EES 105. For example, the EES 105 may store fault detection and characterization data in the consolidated data store 115, the YMS 120 may store yield analysis data in the consolidated data store 115, and the MES 110 may store historical process information in the consolidated data store 115. This permits each of the YMS 120, EES 105 and MES 110 to leverage data generated by the other systems. The consolidated data store 115 may reside on one or more computing devices hosting any of the MES 110, the YMS 120 and EES 105, or on one or more different computing devices.

The EES 105 is a system that manages some or all operations of a manufacturing environment (e.g., factory). The EES 105 may include manual and computerized off-line and/or on-line transaction processing systems that may include client computing devices, server computing devices, databases, etc. that may perform the functions of equipment tracking, dispatching (e.g., determining what material goes to what processes), product genealogy, labor tracking (e.g., personnel scheduling), inventory management, costing, electronic signature capture, defect and resolution monitoring, key performance indicator monitoring and alarming, maintenance scheduling, and so on.

The EES 105 draws inferences from, reports out, and/or acts upon the combined information that is collected and stored in the consolidated data store 115 and/or the metrology data and process data that is reported by the MES 110. For example, EES 105 can act as an early warning system (e.g., predict scrap, initiate product rework, etc.), provide bottleneck analysis, provide asset management (e.g., reduce unscheduled equipment downtime), improve lean practices, etc. The EES 105 can be used to gain an understanding of the manufacturing environment 100, and can enable a user to determine an efficiency of the manufacturing environment 100 and/or how to improve all or components of the manufacturing environment 100. In one embodiment, the EES 105 includes components (e.g., VM multi-algorithm predictive subsystem 107 having VM module, prediction algorithm switching module, etc.) that enable the EES 105 to utilize and determine predictive algorithms for adaptive virtual metrology. Such capabilities are explained in greater detail below with reference to FIGS. 2-7.

The yield management system (YMS) 120 analyzes end-of-line data such as e-test data to determine product yield. The end-of-line data may include wafer acceptance testing (WAT), wafer sort results and/or final test operations. The yield manager 120 can provide product yield trends, lot level analysis of product yield, yield correlation to manufacturing processes, statistical analysis of yield, etc. In one embodiment, the YMS 120 uses integrated circuit design, visible defect, parametric and e-test data to identify causes of low yield.

There are a number of extensions to prediction algorithms that utilize feedback of actual output measurement data, such as metrology or yield analysis, to continually improve or "tune" the prediction models. As an example, NIPALS and EWMA (Exponentially Weighted Moving Average) are two documented adaptive extensions to the Project on Latent Structure prediction mechanisms. These various extensions for handling the dynamics perform differently depending on the prediction and adaptation environment. Further many of the extensions also represent a tradeoff between computational complexity or time, and accuracy.

Prior approaches for Virtual Metrology with adaptation typically use PLS with NIPALS (Non-Iterative Partial Least Squares) or EWMA. The PLS with NIPALS approach is an incremental re-formulation of PLS models and is needed when there is a significant change in conditions. Some form of PLS adaptation is needed to track processes that drift. This approach is more difficult to implement and can require a significant amount of data to re-formulate the model. The approach generally produces more accurate results than model adjustment approaches such as PLS with EWMA. There is a general trade-off between speed of calculation or speed of response due to drift-shift/complexity and accuracy/robustness of algorithms between EWMA and NIPALS. Results indicate that PLS with EWMA filtering can be effective at providing high quality adaptive VM predictions if the process is well behaved, but can produce unsatisfactory results in certain modeling situations in which case PLS+NIPALS modeling should be used. These approaches fail to provide a methodology for leveraging multiple prediction methods for improving prediction for virtual metrology.

As manufacturing environments continue to move from a reactive to predictive mode of operation, the importance of prediction quality continues to rise. One of the major factors impacting prediction quality is the ability of the prediction mechanism to adapt to the dynamics of the factory environment in the presence of process drift and shift, and the entry and exit of external factors impacting the prediction.

The VM multi-algorithm prediction subsystem 107 addresses the above deficiencies by facilitating switching between predictive algorithms or applying weighted combinations of outputs from multiple adaptive extensions to a prediction model. Techniques such as least squares error may be used to assess the quality of the prediction when actual output measurement data is available.

The following methods for determining a predictive algorithm assume a VM prediction equation:

$$S=B*t+c$$

In some embodiments, S is a predicted output, B represents a matrix, t is an input factor, and c is zero'th order term. S, B, t, and c are components vectors or matrices. Given two predictive algorithms EWMA and NIPALS, EWMA is fast and easy, but can be inaccurate when the VM equation changes. The EWMA can utilize zero'th order adaptation of the VM equation (e.g., updates the "c" vector). NIPALS is complex, but more accurate. NIPALS reformulates the VM equation (e.g., updates both "B" and "c"). The VM multi-algorithm prediction subsystem 107 may compare predictions of metrology data (Y') to actual metrology data (Y) on occasion with this difference being E.

Figure 2:
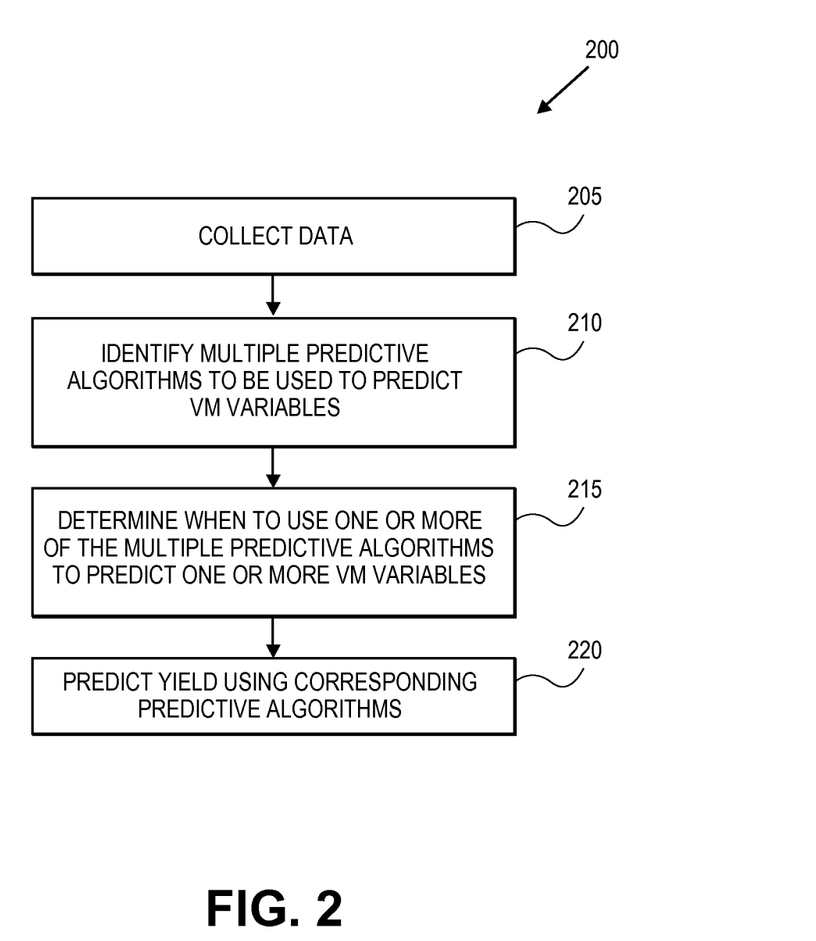
FIG. 2 illustrates a flow diagram of one embodiment for a method of utilizing multiple predictive algorithms.

FIG. 2 illustrates a flow diagram of one embodiment for a computer implemented method of utilizing multiple predictive algorithms. The method may be performed by processing logic that may comprise hardware (e.g., circuitry, dedicated logic, programmable logic, microcode, etc.), software (such as instructions run on a processing device), or a combination thereof. In one embodiment, a computer implemented method 200 is performed by the equipment engineering system 105 or some other system (e.g., a system hosting a VM multi-algorithm prediction subsystem 107 and coupled to the EES 105 via a network).

Referring to FIG. 2, the computer implemented method 200 includes collecting data by an equipment engineering system (block 205). The collected data includes data associated with a manufacturing process, a manufacturing tool and/or a manufactured product. The method 200 includes identifying multiple predictive algorithms to be used to predict VM variables in a manufacturing facility (block 210). One or more of the predictive algorithms may be utilized at a given time. The method 200 includes determining when to use one or more of the multiple predictive algorithms to predict one or more virtual metrology variables in the manufacturing facility (block 215). For example, the method may switch between multiple predictive algorithms based on an error switching threshold. This threshold may be based on actual metrology data. Alternatively, the method may use a quality threshold to determine when to switch between predictive algorithms. In another example, the method may simultaneously utilize multiple predictive algorithms and a predictive algorithm may be invoked based on a weighted average of these predictive algorithms. At block 220, yield is predicted using one or more corresponding predictive algorithms.

Figure 3:
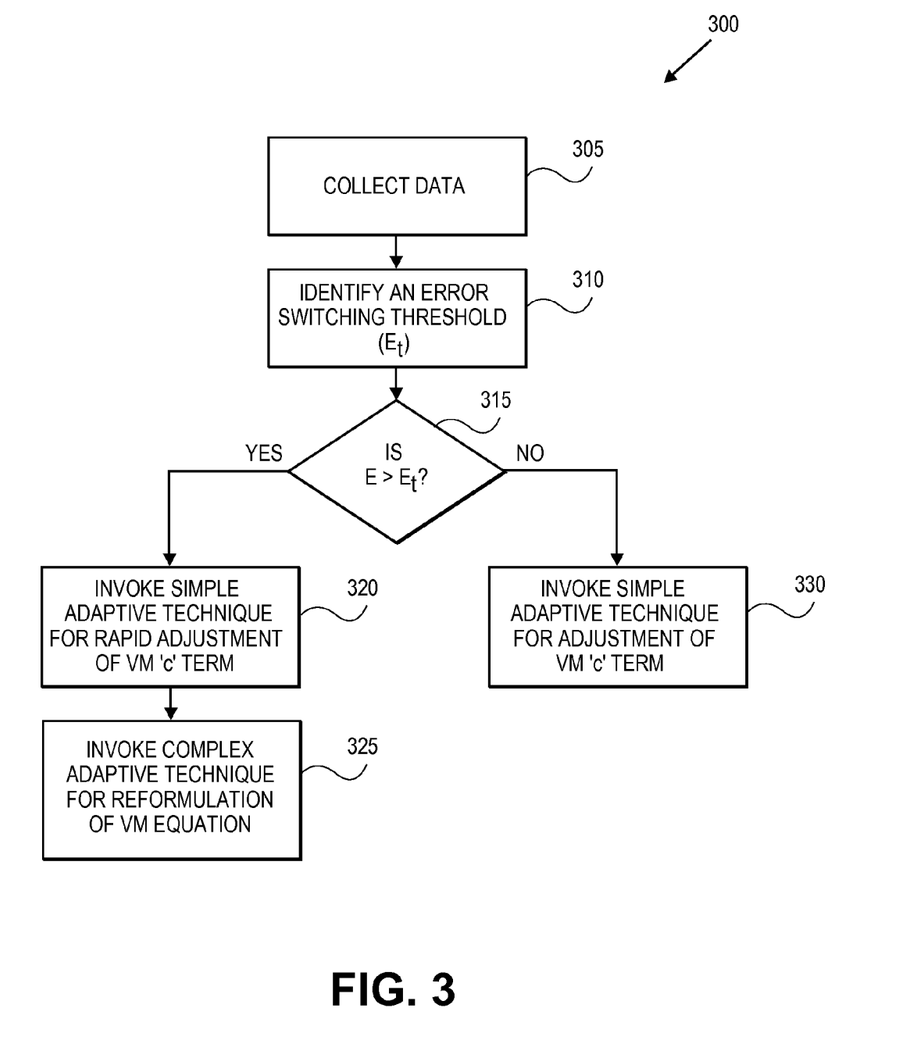
FIG. 3 illustrates a flow diagram of one embodiment for a method of switching between predictive algorithms.

FIG. 3 illustrates a flow diagram of one embodiment for a computer implemented method of switching between predictive algorithms. The method may be performed by processing logic that may comprise hardware (e.g., circuitry, dedicated logic, programmable logic, microcode, etc.), software (such as instructions run on a processing device), or a combination thereof. In one embodiment, a computer implemented method 300 is performed by the equipment engineering system 105 or some other system (e.g., a system hosting a VM multi-algorithm predictive subsystem 107 and coupled to the EES 105 via a network).

Referring to FIG. 3, the computer implemented method 300 includes collecting data with an equipment engineering system (block 305). The collected data includes data associated with a manufacturing process, a manufacturing tool and/or a manufactured product. Such data may be received from a manufacturing machine during processing of a product, from a metrology tool during measuring of a product, or by accessing a data store. The method 300 includes identifying an error switching threshold Et (block 310). In one embodiment, a switching threshold is set up based on a value of an error that is based on a comparison of predictions of metrology data (Y') and actual metrology data (Y). The error switching threshold Et is identified or determined for $|Y-Y'|$. A least squares distance can be used to fold the errors into a single number. Alternatively, each Yn can be treated as a separate component. Assuming that Y is available (i.e., actual metrology measurement available) and the error (E) is filtered over time to minimize noise impact, then the error switching threshold is applied (block 315). If the error (E), which is the difference between predictions of metrology data (Y) and actual metrology measurement data (Y'), is greater than Et, a simple adaptive technique (e.g., EWMA) is invoked for "rapid" adjustment of the VM 'c' term (block 320) and then a more complex adaptive technique (e.g., NIPALS) is invoked for reformulation of the VM equation over a longer time period (block 325). Otherwise, a simple adaptive technique (e.g., EWMA) is invoked for adjustment of the VM 'c' term (block 330). Optionally, the simple adaptive technique may continue to be assessed even if the complex adaptive technique is invoked to allow the complex technique to obtain enough data to provide a formulation that will generate a high quality prediction. Once information provided by the complex technique is used, the solution could use the new formulation, "turn off" the reformulation process, and switch back to the simple adaptive technique once the error (E) falls below Et.

Figure 4:
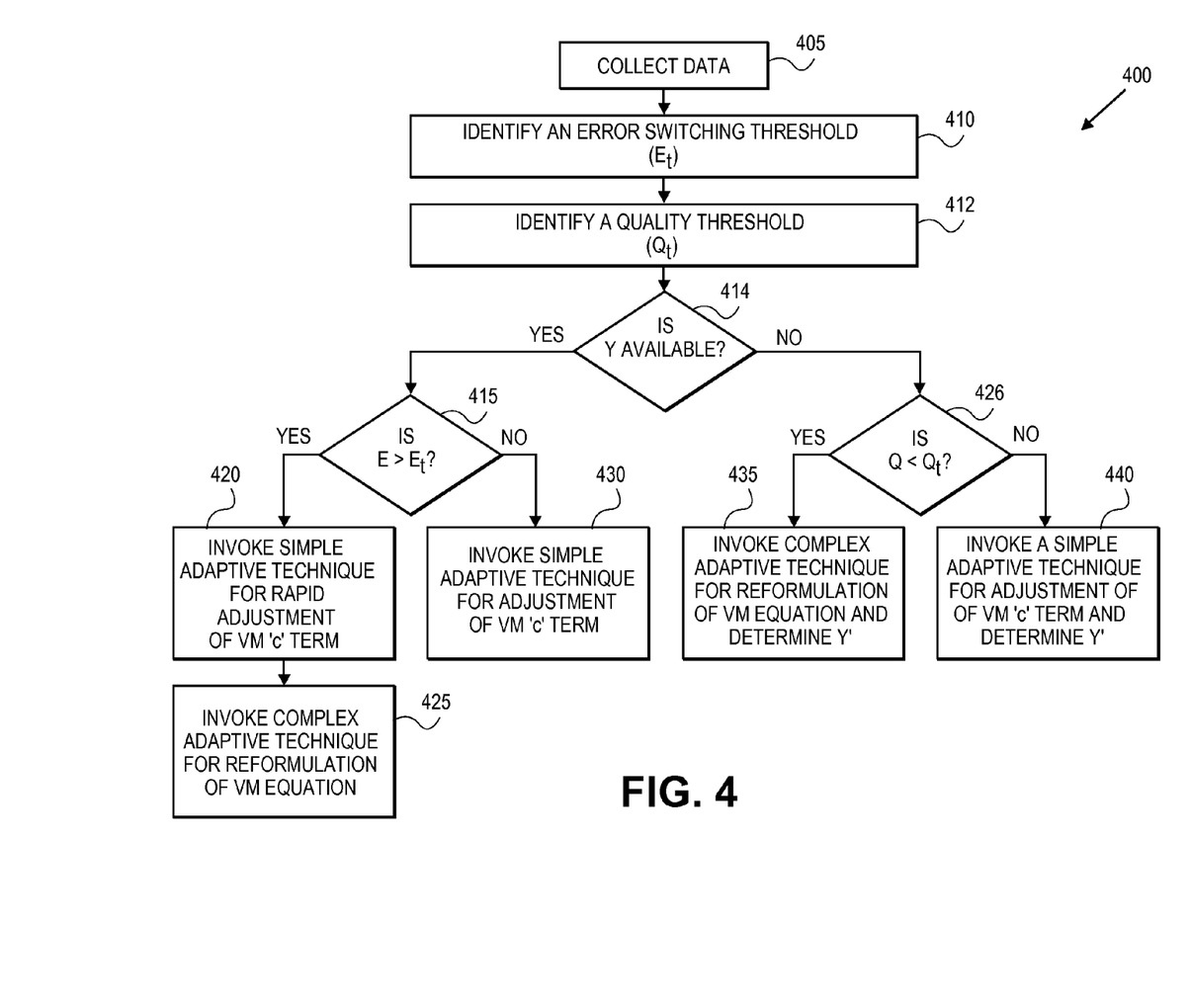
FIG. 4 illustrates a flow diagram of another embodiment for a method of switching between predictive algorithms.

FIG. 4 illustrates a flow diagram of another embodiment for a computer implemented method of switching between predictive algorithms. The method may be performed by processing logic that may comprise hardware (e.g., circuitry, dedicated logic, programmable logic, microcode, etc.), software (such as instructions run on a processing device), or a combination thereof. In one embodiment, a computer implemented method 400 is performed by the equipment engineering system 105 or some other system (e.g., a system hosting a VM multi-algorithm predictive subsystem 107 and coupled to the EES 105 via a network).

Referring to FIG. 4, the computer implemented method 400 includes collecting data by an equipment engineering system (block 405). The collected data includes data associated with a manufacturing process, a manufacturing tool and/or a manufactured product. Such data may be received from a manufacturing machine during processing of a product, from a metrology tool during measuring of a product, or by accessing a data store. The method 400 includes identifying an error switching threshold Et (block 410) in a similar manner as discussed in block 310. The method 400 includes identifying a quality threshold Qt (block 412). A quality $Q_n$ for prediction is associated with each prediction algorithm (e.g., $Q_1$, $Q_2$, etc.). The quality of a prediction is used to determine VM adaptation method when actual metrology data is not available for the current prediction cycle. In this case, techniques are defined in literature that estimate the quality of the predictor (e.g., least-squares approximation of quality of prediction). These estimates can be compared to the Qt.

If Y is available (i.e., actual metrology measurement available) (block 414) and the error is filtered over time to minimize noise impact, then the error switching threshold is applied (block 415). If E>Et, a simple adaptive technique (e.g., EWMA) is invoked for "rapid" adjustment of the VM 'c' term (block 420) and then a more complex adaptive technique (e.g., NIPALS) is invoked for reformulation of the VM equation over a longer time period (block 425). Otherwise if E is not greater than Et, a simple adaptive technique (e.g., EWMA) is invoked for adjustment of the VM 'c' term (block 430). Optionally, the simple adaptive technique may continue to be assessed even if the complex adaptive technique is invoked to allow the complex technique to obtain enough data to provide a formulation that will generate a high quality prediction. Once information provided by the complex technique are used, the solution could use the new formulation, "turn off" the reformulation process, and switch back to the simple adaptive technique once the error E falls below Et.

If Y is not available (i.e., actual metrology measurement not available) and Q>Qt (block 426), then a complex adaptive technique (e.g., NIPALS) is invoked for reformulation of the VM equation, possibly using historical data, and Y' is determined (block 435). Otherwise, a simple adaptive technique (e.g., EWMA) might be invoked for adjustment of the VM 'c' term and Y' is determined (block 440) if there is a capability to estimate how the model might be adjusted.

Figure 5:
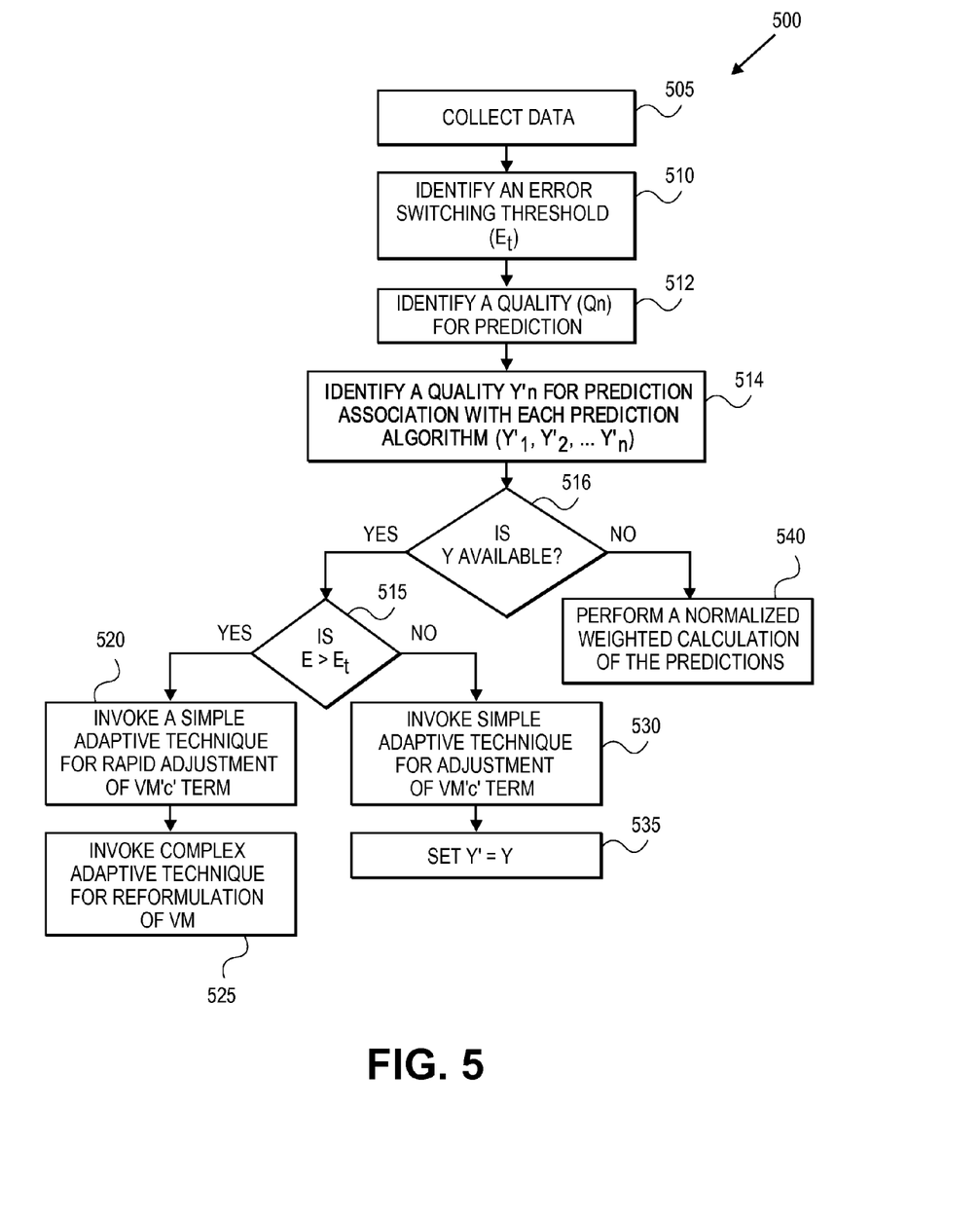
FIG. 5 illustrates a flow diagram of one embodiment for a method of determining predictive algorithms with weighted predictions.

FIG. 5 illustrates a flow diagram of one embodiment for a computer implemented method of determining predictive algorithms with weighted predictions. The method may be performed by processing logic that may comprise hardware (e.g., circuitry, dedicated logic, programmable logic, microcode, etc.), software (such as instructions run on a processing device), or a combination thereof. In one embodiment, method 500 is performed by the equipment engineering system 105 or some other system (e.g., a system hosting a VM multi-algorithm prediction subsystem 107 and coupled to the EES 105 via a network).

Referring to FIG. 5, the computer implemented method 500 includes collecting data by an equipment engineering system (block 505). The collected data includes data associated with a manufacturing process, a manufacturing tool and/or a manufactured product. Such data may be received from a manufacturing machine during processing of a product, from a metrology tool during measuring of a product, or from a data store. The method 500 includes identifying an error switching threshold Et (block 510) in a similar manner as discussed in block 310.

The method 500 includes identifying a quality $Q_n$ for prediction (block 512). A quality $Q_n$ for prediction is associated with each prediction algorithm (e.g., $Q_1$, $Q_2$, etc.). This metric may be defined such that a higher value of Q indicates a higher quality. The availability of a quality for a prediction is a function of the prediction method and historical data associated with the utilization of that predictor. The method 500 includes identifying a quality Y'n for prediction (block 514) associated with each prediction ($Y'_1$, $Y'_2$, ... $Y'_n$) of metrology data. If Y is available (i.e., actual metrology measurement available) (block 516) and the error is filtered over time to minimize noise impact, then the error switching threshold is applied (block 515). If E>Et, then a simple adaptive technique (e.g., EWMA) is invoked for "rapid" adjustment of the VM 'c' term (block 520). Then, NIPALS is invoked for reformulation of the VM equation over a longer time period (block 525). Otherwise if E is not greater than Et, a simple adaptive technique (e.g., EWMA) is invoked for adjustment of the VM 'c' term (block 530) and then the method sets Y'=Y (block 535).

If Y is not available (i.e., actual metrology measurement not available), then the method performs a normalized weighted calculation of the predictions (block 540) where the weights are a function of the quality of each prediction. The normalized weighted calculation follows below.

$$Y = \{[(Q_1)/(Q_1+Q_2+\ldots Q_n)] \cdot Y'_1\} + \{[(Q_2)/(Q_1+Q_2+\ldots Q_n)] \cdot Y'_2\} + \ldots \{[(Q_n)/(Q_1+Q_2+\ldots Q_n)] \cdot Y'_n\}$$

Figure 6:
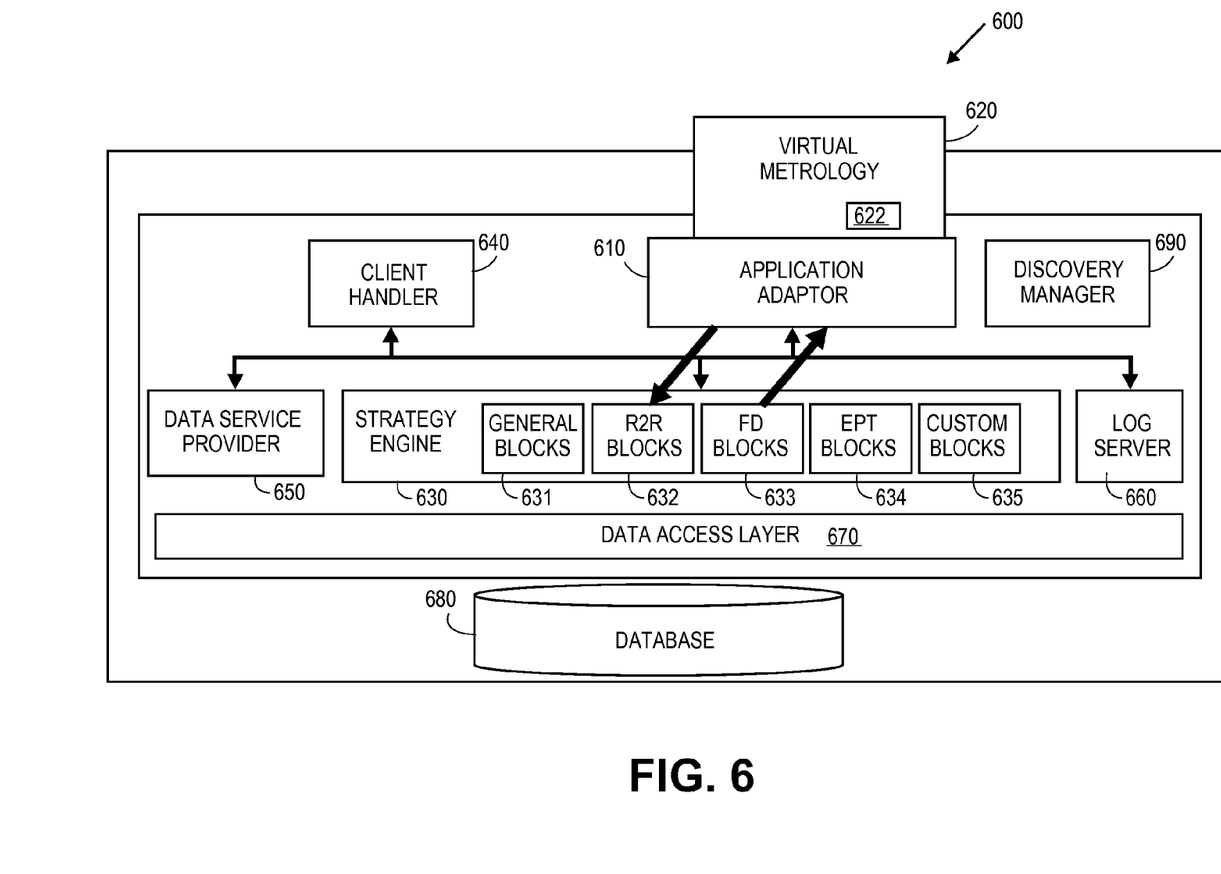
FIG. 6 illustrates an exemplary architecture of an equipment engineering system (EES), in which embodiments of the present invention may operate.

FIG. 6 illustrates an exemplary architecture of an equipment engineering system (EES), in which embodiments of the present invention may operate. In one embodiment, the equipment engineering system (EES) 600 is implemented with an Applied E3™ APC Infrastructure in which methods of the present disclosure are integrated. The EES 600 leverages an E3 application adapter 610 that provides an interface to Web services. VM module 620 can be integrated through Web services. This VM module 620 integration approach enables rapid prototyping, customization, and technology transfer. The VM module 620 includes a predictive algorithm switching module 622 that enables the EES 600 to utilize and determine predictive algorithms for adaptive virtual metrology.

The adapter 610 communicates with the strategy engine 630, the client handler 640, the data service provider 650, and the log server 660. The strategy engine 630 includes general blocks 631, run to run blocks 632, FD blocks 633, EPT blocks 634, and custom blocks 635. The FD blocks 633 obtain FD data. The run to run blocks 632 include pre-configured R2R models. The EPT blocks 634 obtain equipment performance tracking information. The data access layer 670 provides access to a database 680 (e.g., Oracle database). This database 680 includes process data, FDC/EPT/R2R data, control rules, and data collection plans. The discovery manager 690 provides discovery features for identifying capabilities integrated into the system. The strategy engine is used to govern the interaction of blocks in terms of "strategies" to achieve specific objectives in response to events received.

For example, for Wafer-to-Wafer (W2W) Control, a strategy housed by the strategy engine 630 could be envisioned that captures FD outputs from a FD implementation formulated with the FD blocks 633 and stored in the database 680, sends this information to a VM formulation in the VM module 620 (integrated via the web-services adaptor 610) for calculation of VM outputs, retrieves the VM formulation output stored in the database and routes this to W2W implementation realized with the R2R block 632. Collected metrology data is used to update VM models.

Figure 8:
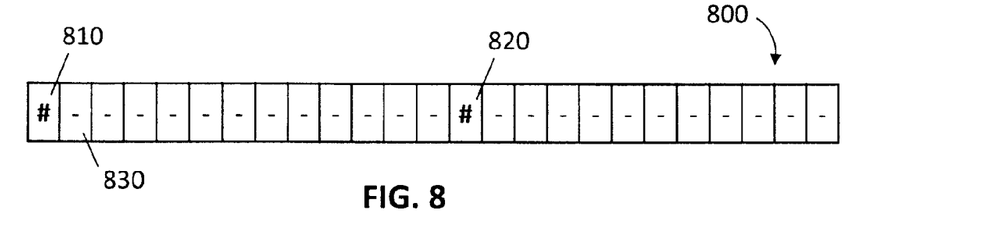
FIG. 8 illustrates a metrology table A.

In some embodiments, VM can be used to "Fill in the Gaps" for W2W Control. FIG. 8 illustrates a metrology table A 800. Metrology table A 800 in one embodiment has only two data values 810, 820 available (e.g., two wafers in a wafer cassette). Each data value 810, 820 represents data for a given wafer or substrate in a grouping of wafers or substrates. No values 830 are available for other wafers or substrates.

Figure 9:
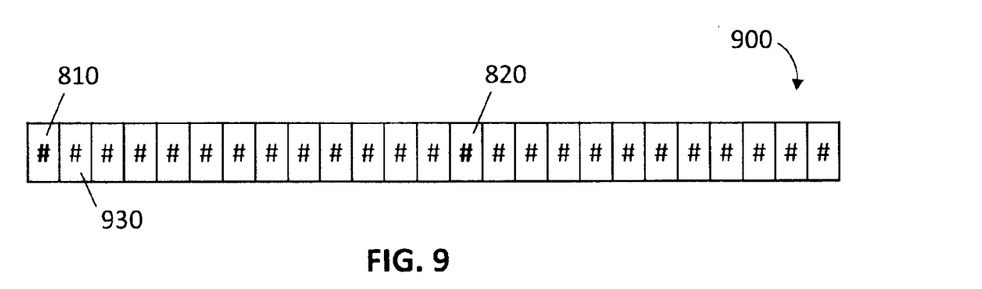
FIG. 9 illustrates a metrology table B.

FIG. 9 illustrates a metrology table B 900. Metrology Table B 900 in one embodiment includes the same two data values 810, 820 (shaded values) as metrology Table A 800 and additionally includes predicted values 930 (non-shaded values) when metrology data isn't available for the other wafers or substrates.

Figure 10:
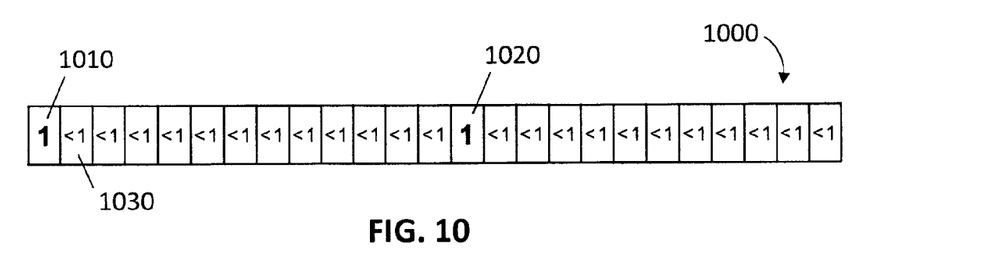
FIG. 10 illustrates a quality indicator table C.

FIG. 10 illustrates a quality indicator table C 1000. The quality indicator table C 1000 indicates quality of prediction for each wafer or substrate. For example, an actual data value 1010, 1020 has a quality value of 1 (if we assume the metrology measurement tool accuracy is high with respect to the application consuming that information) while predicted data values 1030 have a quality value less than 1.

The present disclosure provides methods and apparatuses for switching between multiple adaptive predictive algorithms or determining a predictive algorithm with a weighted application of multiple adaptive predictive algorithms to improve prediction quality switching solutions and weighted application solution can be deployed independently.

Switching solutions provide a more robust prediction solution with more accurate, stable and reliable predictions. An extensible solution for improving predictions as new prediction algorithms are introduced for both switching and weighted applications.

FIGS. 3 and 4 illustrate methods having multiple algorithms that are leveraged in a switching manner based on the actual accuracy of their predictions when actual metrology data is available. Accuracy can be calculated in a least squares distance fashion for a metrology vector, or individually for each metrology attribute, or in any other way deemed appropriate by the user. FIG. 5 illustrates an enhancement of these methods in which multiple algorithms are utilized together to predict metrology data when that metrology data is not available. FIG. 5 invokes the switching method of FIG. 3 or 4 when metrology data is available, but FIG. 5 also is utilized when metrology data is not available. The method of FIG. 5 requires calculation of the quality of the individual method predictions, expressed in a common metric. This method was expressed as a normalization of the contributions from each algorithm, however this is not required.

Figure 7:
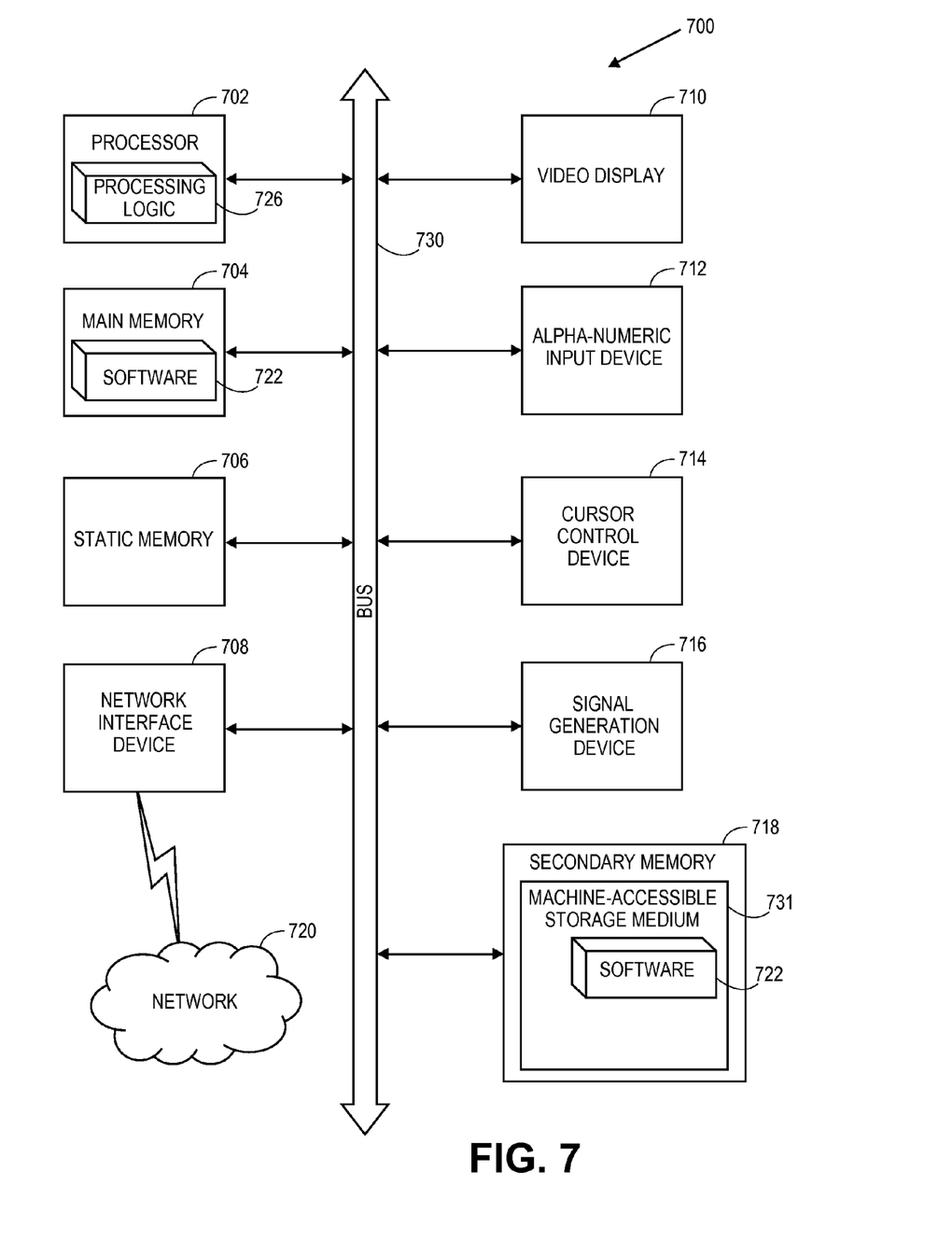
FIG. 7 illustrates a block diagram of an exemplary computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-readable storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-readable storage media. The software 722 may further be transmitted or received over a network 720 via the network interface device 708.

The machine-readable storage medium 731 may also be used to store one or more subsystems of a yield management system (YMS) 120, an equipment engineering system (EES) 105 and/or a manufacturing execution system (MES) 110 (as described with reference to FIG. 1), and/or a software library containing methods that call subsystems of a YMS, EES and/or MES. The machine-readable storage medium 731 may further be used to store one or more additional components of a manufacturing information and control system (MICS), such as a decision support logic component, a real-time monitor, and/or an execution logic component. While the machine-readable storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method comprising:
   identifying, with a multi-algorithm predictive subsystem that is designed to facilitate switching between predictive algorithms, a plurality of predictive algorithms including first and second adaptive predictive algorithms to predict one or more virtual metrology variables in a manufacturing facility;
   identifying a quality threshold that is based on predictions of data and actual measurement data to determine when to switch between the first and second adaptive predictive algorithms;
   comparing a quality for prediction with the quality threshold when actual measurement data for a current prediction cycle is not available; and
   invoking, when the actual measurement data for a current prediction cycle is not available, the first adaptive predictive algorithm if the quality for prediction is less than or approximately equal to the quality threshold to update a prediction equation to adapt to dynamics of the manufacturing facility.

2. The computer implemented method of claim 1, further comprising:
   invoking, when the actual measurement data for a current prediction cycle is not available, the second adaptive predictive algorithm if the quality for prediction is greater than the quality threshold.

3. The computer implemented method of claim 1, further comprising:
   identifying a quality for prediction for each predictive algorithm;
   identifying a quality for prediction for each prediction of data; and
   performing a normalized weighted calculation of the predictions where weights are a function of the quality for prediction for each predictive algorithm if the actual measurement data is not available.

4. The computer implemented method of claim 1, further comprising:
   identifying an error switching threshold that is based on a comparison of predictions of data and actual data.

5. The computer implemented method of claim 4, further comprising:
   determining whether an error, which is a difference between predictions of data and actual measurement data, is greater than the error switching threshold.

6. The computer implemented method of claim 5, further comprising:
invoking, when actual measurement data for the current prediction cycle is available, the first adaptive predictive algorithm for updating the prediction equation if an error is greater than the error switching threshold; and
subsequently invoking the second adaptive predictive algorithm for updating the prediction equation.

7. The computer implemented method of claim 5, further comprising:
invoking, when actual measurement data for the current prediction cycle is available, the first adaptive predictive algorithm if the error is less than or approximately equal to the error switching threshold.

8. A computer-readable non-transitory storage medium comprising executable instructions to cause a processor to perform operations, the instructions comprising:
identifying, with a multi-algorithm predictive subsystem that is designed to facilitate switching between predictive algorithms, a plurality of predictive algorithms including first and second adaptive predictive algorithms to predict one or more virtual metrology variables in a manufacturing facility;
identifying a quality threshold that is based on predictions of data and actual measurement data to determine when to switch between the first and second adaptive predictive algorithms;
comparing a quality for prediction with the quality threshold when actual measurement data for a current prediction cycle is not available; and
invoking, when the actual measurement data for a current prediction cycle is not available, the first adaptive predictive algorithm if the quality for prediction is less than or approximately equal to the quality threshold to update a prediction equation to adapt to dynamics of the manufacturing facility.

9. The computer implemented method of claim 8, further comprising:
invoking, when the actual measurement data for a current prediction cycle is not available, the second adaptive predictive algorithm if the quality for prediction is greater than the quality threshold.

10. The computer implemented method of claim 8, further comprising:
identifying a quality for prediction for each predictive algorithm;
identifying a quality for prediction for each prediction of data; and
performing a normalized weighted calculation of the predictions where weights are a function of the quality for prediction for each predictive algorithm if the actual measurement data is not available.

11. The computer implemented method of claim 8, further comprising:
identifying an error switching threshold that is based on a comparison of predictions of data and actual data.

12. The computer implemented method of claim 8, further comprising:
determining whether an error, which is a difference between predictions of data and actual measurement data, is greater than the error switching threshold.

13. The computer implemented method of claim 12, further comprising:
invoking, when actual measurement data for the current prediction cycle is available, the first adaptive predictive algorithm for updating the prediction equation if an error is greater than the error switching threshold; and subsequently invoking the second adaptive predictive algorithm for updating the prediction equation.

14. The computer implemented method of claim 12, further comprising:
invoking, when actual measurement data for the current prediction cycle is available, the first adaptive predictive algorithm if the error is less than or approximately equal to the error switching threshold.

15. A computer system comprising:
a memory to store a plurality of predictive algorithms; and
and at least one processing device, coupled to the memory, that is configured to execute processing logic to:
identify the plurality of predictive algorithms including first and second adaptive predictive algorithms to predict one or more virtual metrology variables in a manufacturing facility;
identify a quality threshold that is based on predictions of data and actual measurement data to determine when to switch between the first and second adaptive predictive algorithms;
compare a quality for prediction with the quality threshold when actual measurement data for a current prediction cycle is not available; and
invoking, when the actual measurement data for a current prediction cycle is not available, the first adaptive predictive algorithm if the quality for prediction is less than or approximately equal to the quality threshold to update a prediction equation to adapt to dynamics of the manufacturing facility.

16. The computer system of claim 15, wherein the at least one processing device is further configured to execute processing logic to:
invoke, when the actual measurement data for a current prediction cycle is not available, the second adaptive predictive algorithm if the quality for prediction is greater than the quality threshold.

17. The computer system of claim 16, wherein the at least one processing device is further configured to execute processing logic to:
identify a quality for prediction for each predictive algorithm;
identify a quality for prediction for each prediction of data; and
perform a normalized weighted calculation of the predictions where weights are a function of the quality for prediction for each predictive algorithm if the actual measurement data is not available.

18. The computer system of claim 15, wherein the at least one processing device is further configured to execute processing logic to:
identify an error switching threshold that is based on a comparison of predictions of data and actual data; and
determine whether an error, which is a difference between predictions of data and actual measurement data, is greater than the error switching threshold.

19. The computer system of claim 18, wherein the at least one processing device is further configured to execute processing logic to:
invoke, when actual measurement data for the current prediction cycle is available, the first adaptive predictive algorithm for updating the prediction equation if an error is greater than the error switching threshold; and
subsequently invoke the second adaptive predictive algorithm for updating the prediction equation.

20. The computer system of claim 18, wherein the at least one processing device is further configured to execute processing logic to:
    invoke, when actual measurement data for the current prediction cycle is available, the first adaptive predictive algorithm if the error is less than or approximately equal to the error switching threshold.

\* \* \* \* \*